United States Patent [19]

Li et al.

[11] Patent Number: 5,972,489

[45] Date of Patent: Oct. 26, 1999

[54] POROUS INORGANIC MATERIAL AND METAL-MATRIX COMPOSITE MATERIAL CONTAINING THE SAME AND PROCESS THEREFOR

[75] Inventors: Jianxing Li, Tokyo; Junichi Ogawa, Kanagawa; Mitsushi Wadasako, Shizuoka, all of Japan

[73] Assignee: Nichias Corporation, Tokyo, Japan

[21] Appl. No.: 08/683,404

[22] Filed: Jul. 18, 1996

[30] Foreign Application Priority Data

Jul. 18, 1995 [JP] Japan ..................................... 7-202772
Jan. 25, 1996 [JP] Japan ..................................... 8-030163

[51] Int. Cl.$^6$ ................................................... C04B 35/81
[52] U.S. Cl. .................... 428/312.2; 428/688; 501/95.3; 501/96.1; 501/153
[58] Field of Search ............................. 428/312.2, 688; 501/95.3, 153, 96.1

[56] References Cited

U.S. PATENT DOCUMENTS 4,948,766 8/1990 Talmy et al. ............................. 501/128

FOREIGN PATENT DOCUMENTS

| 0 396 147 | 11/1990 | European Pat. Off. . |
| 0672800 | 3/1994 | Japan . |
| 6-33193 | 5/1994 | Japan . |
| 6-35630 | 5/1994 | Japan . |
| 6122600 | 5/1994 | Japan . |
| 7330500 | 12/1996 | Japan . |
| 90/01471 | 2/1990 | WIPO . |

OTHER PUBLICATIONS

The English translation of JP0672800, Mar. 1994.
The English translation of JP7330500, Dec. 1996.
The English translation of JP06122600 May 1994.
Database WPI, Section Ch, Week 9243, Derwent Publications Ltd., London, GB; Class A60, AN 94–186337, XP002016239 & JP 06 122 600 A (Shikoku Kasei Kogyo KK), May 6, 1994, *abstract*.
Database WPI, Section Ch, Week 9608, Derwent Publications Ltd., London, GB; XP002016240 & JP 07 330 500 A (Nichias Corp), Dec. 19, 1995 *abstract*.
Patent Abstracts Of Japan, vol. 018, No. 322 (C–1214), Jun. 20, 1994 & JP 06 072800 A (Denki Kagaku Kogyo KK), Mar. 15, 1994.

*Primary Examiner*—Jenna Davis
*Attorney, Agent, or Firm*—Pillsbury Madison & Sutro LLP

[57] ABSTRACT

An in-situ porous inorganic material with a skeleton structure of aluminum borate whiskers, and a whisker-reinforced metal-matrix composite material including the porous inorganic material as a reinforcement, has aluminum borate whiskers distributed uniformly and randomly therein. Each of a plurality of the aluminum borate whiskers is bonded to at least another one of the aluminum borate whiskers at a bonding site, which is formed from aluminum borate common to and constituting part of each one of the aluminum borate whiskers bonded at the bonding site. A process of producing the in-situ porous inorganic material includes the steps of firing a compact of mixed powder including an aluminum compound, a boron compound, and a nickel compound and thereby in-situ synthesizing the aluminum borate whiskers.

5 Claims, 1 Drawing Sheet

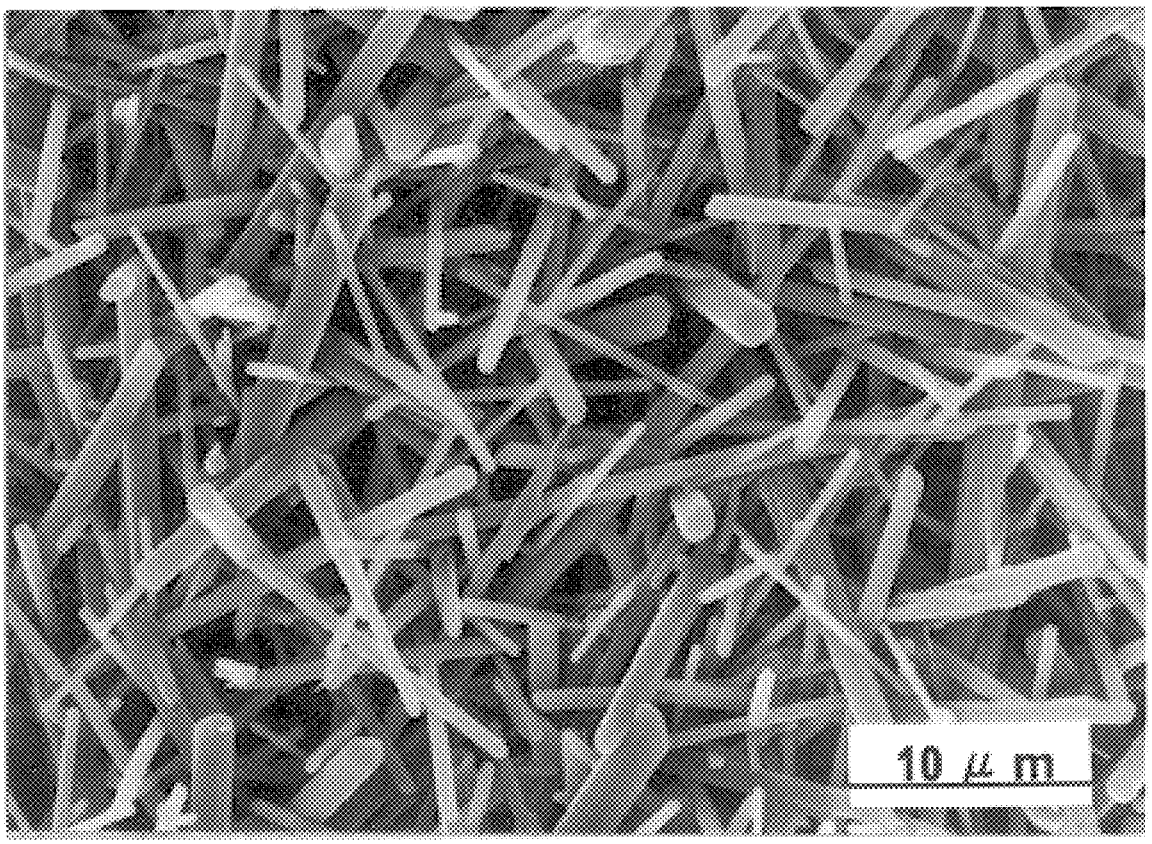

POROUS INORGANIC MATERIAL AND METAL-MATRIX COMPOSITE MATERIAL CONTAINING THE SAME AND PROCESS THEREFOR

FIELD OF THE INVENTION

This invention relates to a porous inorganic material and a process for producing the same. More particularly, it relates to an in situ synthesized porous inorganic material with a skeleton structure of aluminum borate whiskers useful as a reinforcement of whisker reinforced metal matrix composite materials (WRM), a structural material for high-temperature use, a heat insulating material, a frictional material, a filter medium, and the like, and a process for producing the same. Furthermore, it relates to a metal-matrix composite material comprising a light alloy, such as an aluminum alloy, uniformly reinforced by the in situ synthesized porous inorganic material with a skeleton structure of aluminum borate whiskers and a process for producing the same.

BACKGROUND OF THE INVENTION

Ceramic whiskers comprising silicon nitride, silicon carbide, alumina, aluminum borate, potassium titanate, titanium oxide, etc. are excellent in mechanical characteristics, heat resistance, corrosion resistance, heat insulating properties, wearability, and electrical insulating properties and have been their use has been extended into many fields such as WRM, WRP (whisker reinforced plastic), and WRC (whisker reinforced ceramic).

On the other hand, with recent developments in of the automobile industries and the aircraft and aerospace industry, there has been an increasing demand for high-strength and high-modulus metallic materials which are light and excellent in heat resistance and wearability. Due to the increase in cases in which conventional aluminum alloys cannot meet the demand, reinforcement of metal with heat-resistant fibrous materials or whiskers has been attempted, and many proposals have been made on metallic materials reinforced by this method, i.e., metal-matrix composite materials.

Whiskers comprising silicon nitride, silicon carbide, alumina, aluminum borate, potassium titanate, titanium oxide, etc. can be exemplified as the typical reinforcements which have hitherto been used for production of metal-matrix composite materials. Since it is difficult to disperse extremely fine whiskers in a molten metal uniformly, whisker-reinforced metal-matrix composite materials have generally been obtained by previously forming whiskers into a porous body called a preform and infiltrating a molten metal into the pores of the preform.

A whisker preform has conventionally been prepared by dispersing whiskers and a binder in water and filtering the aqueous dispersion with suction, followed by drying and calcination. The conventional process has several problems. Firstly, whiskers, which are light and fine, are liable to scatter when dispersed in water and, if inhaled, may endanger workers' health. A strict countermeasure should be taken against scattering. Secondly, while a whisker dispersion is filtered, the whiskers having a needle shape are unavoidably oriented in a specific direction or localized (unevenly distributed), and the orientation and localization remain in the resulting preform. Needless to say, a uniform reinforcing effect cannot be expected from a preform having whiskers oriented or unevenly distributed. Thirdly, since the physical properties of a preform, such as strength and heat resistance, are considerably influenced by the binder used in combination, the excellent properties essential to whiskers cannot be taken full advantage of. Fourthly, it is difficult to obtain a preform having the density and dimensions as originally designed because of considerable change in volume occurring during filtering up to the completion of firing. Another problem is that the whisker preform is extremely expensive because, for one thing, the whiskers as a raw material are expensive.

The above-mentioned problems have been pointed out with respect to not only a whisker preform itself but various products utilizing a whisker preform, and have made it difficult to take full advantage of the excellent properties of whiskers. Furthermore, when the conventional whisker preform is used for reinforcement of metal, it has the following problems. Since the bonding strength among whiskers in a preform is not so strong, the preform tends to be deformed or broken when a molten metal is infiltrated therein. The binder in a preform tends to react with a molten metal, e.g., aluminum, to cause reduction in strength.

JP-B-6-33193 (the term "JP-B" as used herein means an "examined published Japanese patent publication") discloses a process for producing rigid mullite whisker felt, the process having succeeded in solving the problems associated with preparation of whisker preforms as far as mullite whisker is concerned. The disclosed process comprises heating a green compact comprising a mixture of $AlF_3$ and $SiO_2$ in an anhydrous $SiF_4$ atmosphere at about 700 to 950° C. to form rod-like topaz crystals from $AlF_3$ and $SiO_2$, and further heating the topaz crystals at about 1150 to 1700° C. to convert the topaz crystals to needle-like single crystal mullite whiskers. According to this process, since mullite whiskers are grown by the reaction in a compact, the mullite whiskers are bound to each other during the growth, and a whisker felt is completed on the completion of whisker growth. Therefore, the whisker filtering process for forming a whisker preform, which is accompanied with many difficulties, is unnecessary, and the resulting product is therefore free from the above-described drawbacks arising from filtering.

However, this process, while seeming advantageous, is not easy to carry out because of the involvement of additional cost for the equipment and the process control due to the calcination in a toxic anhydrous $SiF_4$ atmosphere. Besides, the product is limited to mullite materials, and the applicability of the technique is limited. A process for producing whiskers other than mullite whiskers in which whisker formation and formation of a porous body are carried out at the same time is unknown.

SUMMARY OF THE INVENTION

An object of the invention is to provide an in situ synthesized porous inorganic material (also referred to herein as a porous ceramic sintered product) with a skeleton structure of whiskers, in which the excellent properties essential to whiskers can be fully displayed and to provide a process for producing the above mentioned porous inorganic material.

Another object of the invention is to provide a metal-matrix composite material having improved anisotropy and uniformity in its physical properties, being excellent in heat resistance and strength, and being yet inexpensive, as compared with conventional materials prepared by using a whisker preform as a reinforcement.

A further object of the invention is to provide a process for producing a metal-matrix composite material which is superior in workability and yield to a conventional process using a whisker preform as a reinforcement and provides a product which has improved anisotropy and uniformity in its physical properties and is excellent in heat resistance and strength.

The above objects are accomplished by the following embodiments.

(1) A porous inorganic material (sometimes referred to as "porous ceramic") comprising aluminum borate whiskers distributed uniformly and randomly, in which the individual aluminum borate whisker are bonded to other whisker(s) at one site or more thereof in such a manner that the two or more whiskers share a bond made up of aluminum borate constituting themselves.

(2) A porous inorganic material of item (1), wherein said material is an in situ synthesized porous inorganic material with a skeleton structure of aluminum borate whiskers, which is synthesized by firing of a green (powder) compact of a mixture of aluminum borate whisker-forming raw materials to a skeleton structure of aluminum borate whiskers.

(3) A process for in situ producing a porous inorganic material with a skeleton structure of aluminum borate whiskers comprising uniformly mixing in a powdered state aluminum oxide or an aluminum compound capable of forming aluminum oxide on heating in air, boron oxide or a boron compound capable of forming boron oxide on heating in air, and at least one additive selected from the group consisting of nickel, nickel oxide, iron, iron oxide, vanadium, vanadium oxide, silicon, silicon dioxide, and the compounds capable of forming such oxides on heating in air, compacting the resulting mixed powder in a die, and firing the resulting powder compact to in situ synthesize aluminum borate whiskers.

(4) A metal-matrix composite material uniformly reinforced with a porous ceramic, which is obtained by firing a green compact of a mixture of aluminum borate whisker-forming raw materials to in situ synthesize aluminum borate whiskers (preferably $9Al_2O_3 \cdot 2B_2O_3$) in the compact.

(5) A process for producing a porous ceramic-reinforced metal-matrix composite material, which comprises firing a green compact of a mixture of aluminum borate whisker-forming raw materials to in situ synthesize aluminum borate whiskers in the compact, preheating the resulting porous ceramic body, infiltrating a molten matrix metal into the pores of the porous ceramic body, and cooling the infiltrated ceramic body to solidify the metal.

In the porous inorganic material of the invention, the individual whiskers are not bonded with a binder but by sharing of aluminum borate constituting each whisker. After an individual aluminum borate whisker comes into contact with other whisker(s) while it is growing, the whisker continues growing while sharing aluminum borate constituting the whiskers at the contact site.

Therefore, the porous inorganic material has a constitution in which whiskers are bonded at their contact sites as if they were fused together or two whiskers are crossing each other, one piercing the other. Such a constitution is never observed in the case where previously prepared whiskers are bonded via a binder or by sintering.

Owing to the fact that the porous inorganic material consists solely of whiskers which are non-oriented and distributed quite randomly and yet uniformly and the fact that a plurality of whiskers are bonded together by sharing a whisker-forming substance without being assisted by a binder, the porous inorganic material of the invention exhibits high strength, high heat resistance and corrosion resistance, in comparison with any conventional whisker preform prepared by using a binder or by sintering.

BRIEF DESCRIPTION OF THE DRAWING

FIGURE is a scanning electron micrograph (x2000) of the porous inorganic material obtained in Example 1.

DETAILED DESCRIPTION OF THE INVENTION

The aluminum compound which can be used as a raw material is aluminum oxide or an aluminum compound capable of forming aluminum oxide on heating in air (hereinafter referred to as an aluminum oxide precursor). The aluminum oxide precursor is preferably one capable of forming aluminum oxide on heating at a temperature of about 1000° C. or lower in air, with the lower limit of the temperature being generally about 350° C. Examples of the aluminum oxide precursor include aluminum hydroxide, aluminum sulfate, aluminum nitrate, and aluminum chloride.

The boron compound to be reacted with the aluminum compound is boron oxide (boron trioxide $B_2O_3$) or a boron compound capable of forming boron oxide on heating in air (hereinafter referred to as a boron oxide precursor). The boron oxide precursor is preferably one capable of forming boron oxide on heating at a temperature of about 1000° C. or lower, with the lower limit of the temperature being generally about 150° C. Examples of the boron oxide precursor include boric acid ($H_3BO_3$), tetraboric acid ($H_2B_4O_7$) and metaboric acid ($HBO_2$).

In order for the aluminum compound and the boron compound to react at a high temperature to form aluminum borate whiskers, it is necessary to an additive, for example, nickel oxide, metallic nickel powder or a nickel compound capable of forming nickel oxide on heating in air (hereinafter inclusively referred to as a nickel additive). Unless a nickel additive is present, the aluminum compound and the boron compound react only to provide aluminum borate which cannot form whiskers in the case of high $Al_2O_3$ to $B_2O_3$ molar ratio (9:2 to 9:6), though it is not clear why the coexistence of the nickel additive enables the formation of aluminum borate whiskers.

Preferred examples for the nickel compound of forming nickel oxide include nickel hydroxide, nickel chloride, nickel carbonate, and nickel sulfate. The nickel additives may be used either individually or as a combination of two or more thereof.

The aluminum compound, boron compound and nickel additive are finely powdered and uniformly blended. A preferred mixing ratio is such that an $Al_2O_3$ to $B_2O_3$ molar ratio is 9:2 to 9:6, more preferably 9:3 to 9:4.5 and that the amount of the nickel additive is generally from about 0.1 to 10% by weight, preferably about 1 to 2% by weight, based on the total amount of the aluminum compound and the boron compound. At the preferred mixing ratio as specified above, aluminum borate whiskers having a composition of $9Al_2O_3 \cdot 2B_2O_3$ which has particularly excellent heat resistance can be produced at good efficiency. In place of the nickel additive, iron, iron oxide, vanadium, vanadium oxide, silicon, silicon dioxide, and compounds capable of forming such oxides on heating in air may be used generally in an amount of from 0.1 to 10% by weight based on the total amount of the aluminum compound and the boron compound.

The resulting uniform mixture is put in a die and compacted. The shape can be selected arbitrarily according to that of a porous inorganic material to be obtained. The higher compacting pressure provides a green compact having a higher density, i.e., a lower porosity. Therefore, by adjusting the compacting pressure, a porous inorganic material having a density falling in the range of from about 0.4 to 1.5 g/cm$^3$, which corresponds to a porosity of about 85 to 50%, can be prepared. If a porous inorganic material having a high porosity exceeding about 85% is desired, it is effective to previously mix the raw materials for molding with carbon black, a powdered organic substance, such as carbon black, synthetic resin powder, starch, etc. The above-described substance can be generally added in an amount of 50% by weight or less based on the total amount of the aluminum compound and the boron compound. The above-described substance will be burnt away in the subsequent heating step to leave pores, thereby reducing the density of the porous inorganic material. By this manipulation, a porous inorganic material having a density minimized to about 0.15 g/cm$^3$ (corresponding to a porosity of about 95%) can be obtained.

Binders or lubricants for facilitating compacting may be used, while not essential, as long as the binders or lubricants do not interfere with whisker growth.

The green compact removed from the die is then fired in a furnace in air. Where an aluminum oxide precursor and/or a boron oxide precursor is/are used as a raw material, a corresponding oxide is first produced on heating. The firing temperature necessary to produce aluminum borate whiskers from aluminum oxide and boron oxide ranges approximately from 1100 to 1400° C. In this temperature range, boron oxide is considerably vaporized, and the boron oxide partial pressure of the atmosphere increases as a result.

Upon reaction between aluminum oxide and boron oxide in the presence of nickel additive, aluminum borate crystals, usually having a composition of $9Al_2O_3 \cdot 2B_2O_3$, grow into whiskers. The starting points of growth are distributed uniformly throughout the compact, and the direction of the growth is quite at random in three dimensions. Since the whisker formation proceeds within a dense compact, a growing whisker comes into contact with another growing whisker, whereby aluminum borate is formed at the contact point, which is shared by the two whiskers to provide a bond.

Even after completion of the reaction for aluminum borate whisker growth, firing may be continued to remove all the excess boron oxide by vaporization. Alternatively, the excess boron oxide may be washed away with hot water after firing.

After the reaction, the sintered compact is allowed to cool to provide a porous inorganic material composed of aluminum borate whiskers. The resulting porous inorganic material has substantially the same geometry as the green compact before firing. The shrinkage due to structural change is about 10% at the most. Fine intercommunicating pores remain in the porous inorganic material, and the volume thereof, which is decided by the density of the green compact and the excess of boron oxide, is usually 50 to 95% of the volume of the porous inorganic material. As a result, the porous inorganic material has a density of about 0.15 to 1.5 g/cm$^3$.

The nickel additive which has participated in whisker formation appears to solubilize in the aluminum borate which constitutes the whiskers in a solid state and in the form of an oxide thereof.

The thus prepared porous inorganic material can be applied to arbitrary uses either as sintered or after cutting. For example, it is useful as a preform for producing WRM or other composite materials, a structural material for high temperature use, a heat insulating material, a filter medium, and the like in the fields where the high heat resistance and excellent corrosion resistance of aluminum boron whiskers and high strength owing to the common bonds made up of the constituting substance can be taken advantage of.

The metal-matrix composite material of the invention using the thus prepared porous inorganic material as a reinforcement can be obtained by a conventional process, for example, squeeze casting or pressure casting. That is, the porous ceramic body, either as sintered or after appropriate cutting, is preheated sufficiently and set in a die, and a molten matrix metal is infiltrated into the pores under pressure, followed by cooling.

Suitable examples of the metal which can be used in combination with the porous inorganic material to constitute the composite material include various aluminum alloys and magnesium alloys.

For WRM, the porous inorganic material prepared by the use of the nickel additive is especially suitable.

The present invention will now be illustrated in greater detail with reference to Examples, but it should be understood that the invention is not construed as being limited thereto. Unless otherwise indicated, all the parts are by weight.

EXAMPLE 1

Ten grams of aluminum hydroxide as an aluminum oxide precursor, 3.5 g of orthoboric acid ($H_3BO_3$) as a boron oxide precursor, and 0.13 g of nickel oxide were thoroughly mixed in a mortar, and the mixed powder was compacted in a die to obtain a green compact having a density of 0.32 g/cm$^3$. The green compact was fired in a furnace at 1250° C. for 6 hours to form aluminum borate whiskers. The heating was further continued for an additional 4-hour period at the same temperature to vaporize residual boron oxide, then the material was allowed to cool to obtain a porous inorganic material weighing 7.66 g and having a density of 0.47 g/cm$^3$ and a compressive strength of 70 kgf/cm$^2$. The aluminum borate whiskers constituting the material was found to have an average diameter of 0.6 μm and a length of 20 to 30 μm. The scanning electron microscope photograph (x2000) of the resulting porous material is shown in FIGURE.

EXAMPLE 2

Ten grams of aluminum hydroxide as an aluminum oxide precursor, 3.5 g of orthoboric acid ($H_3BO_3$) as a boron oxide precursor, and 0.13 g of nickel oxide were thoroughly mixed in a mortar, and the mixed powder was compacted in a die to obtain a green compact having a density of 0.45 g/cm$^3$. The green compact was fired in a furnace at 1250° C. for 10 hours to form aluminum borate whiskers, then allowed to cool to obtain a porous inorganic material weighing 7.66 g and having a density of 0.71 g/cm$^3$ and a compressive strength of 105 kgf/cm$^2$. The aluminum borate whiskers constituting the material was found to have an average diameter of 0.6 μm and a length of 20 to 30 μm.

EXAMPLE 3

Ten grams of aluminum hydroxide as an aluminum oxide precursor, 2.19 g of orthoboric acid ($H_3BO_3$) as a boron oxide precursor, and 0.1 g of nickel oxide were thoroughly mixed in a mortar, and the mixed powder was compacted in a die to obtain a green compact having a density of 0.65 g/cm³. The green compact was fired in a furnace at 1300° C. for 6 hours to form aluminum borate whiskers. The firing was further continued for an additional 4-hour period at 1250° C. to vaporize residual boron oxide, then the material was allowed to cool to obtain a porous inorganic material weighing 7.63 g and having a density of 0.94 g/cm³ and a compressive strength of 150 kgf/cm². The aluminum borate whiskers constituting the material was found to have an average diameter of 0.8 μm and a length of 10 to 20 μm.

EXAMPLE 4

Twenty-two grams of aluminum sulfate as an aluminum oxide precursor, 1.97 g of boron oxide as a boron oxide precursor, and 0.13 g of nickel oxide were thoroughly mixed in a mortar, and the mixed powder was compacted in a die to obtain a green compact having a density of 0.35 g/cm³. The green compact was fired in a furnace at 1200° C. for 6 hours to form aluminum borate whiskers. The fired body was washed with hot water to remove residual boron oxide, followed by heat drying, to obtain a porous inorganic material weighing 7.68 g and having a density of 0.43 g/cm³ and a compressive strength of 65 kgf/cm². The aluminum borate whiskers constituting the material was found to have an average diameter of 0.4 μm and a length of 10 to 25 μm.

EXAMPLES 4A TO 4C

Porous inorganic materials were prepared in the similar manner except that the following raw materials were used and synthesis was conducted at 1400° C. for 6 hours.

| Raw Material 1 | |
| --- | --- |
| Aluminum hydroxide | 70.5 wt % |
| Boric acid | 27.9 wt % |
| SiO$_2$ | 0.7 wt % |
| Fe | 0.9 wt % |

The obtained porous inorganic material had a density of 0.48 g/cm³ and a compressive strength of 82 kgf/cm².

| Raw Material 2 | |
| --- | --- |
| Aluminum hydroxide | 68.9 wt % |
| Boric acid | 27.3 wt % |
| SiO$_2$ | 0.7 wt % |
| Fe | 0.9 wt % |
| V$_2$O$_5$ | 2.2 wt % |

The obtained porous inorganic material had a density of 0.50 g/cm³ and a compressive strength of 92 kgf/cm².

| Raw Material 3 | |
| --- | --- |
| Aluminum hydroxide | 69.5 wt % |
| Boric acid | 27.3 wt % |
| SiO$_2$ | 0.7 wt % |
| Fe$_2$O$_3$ | 2.3 wt % |

The obtained porous inorganic material had a density of 0.48 g/cm³ and a compressive strength of 85 kgf/cm².

In the porous inorganic material prepared by the use of Fe, Fe$_2$O$_3$, SiO$_2$, and/or V$_2$O$_5$ as the additive, the residual amount of the additive in the material is large (5 to 10 wt %), the length of the prepared whiskers is short (about 10 μm to 20 μm), and the diameter thereof is about 0.8 μm. On the other hand, in the porous inorganic material prepared by the use of the nickel compound, the residual amount of the additive in the material is 1 to 2 wt % and the length of the whiskers is 10 to 30 μm. Furthermore, in the case where the porous inorganic material is prepared by the use of Fe, Fe$_2$O$_3$, SiO$_2$, and/or V$_2$O$_5$, high temperature is required for preparing the porous inorganic material.

EXAMPLES 5 TO 7

73.2 wt % of aluminum hydroxide as an aluminum oxide precursor, 25.8 wt % of orthoboric acid (H$_3$BO$_3$) as a boron oxide precursor, and 1 wt % of nickel oxide were thoroughly ground and mixed in a grinding machine. The resulting mixed powder was compacted in a die to obtain three disks having a green density varying from 0.41 to 0.92 g/cm³. The die used had such a shape that a disk-like ceramic having a diameter of 100 mm and a thickness of 20 mm was obtained after firing. The disks were fired in a furnace at 1250° C. for 6 hours to in situ synthesize aluminum borate whiskers (9Al$_2$O$_3$·2B$_2$O$_3$) in the compact. After cooling, the sintered compact was washed with hot water to remove unreacted boron oxide. Thus, three porous ceramic bodies having a porosity of 80%, 70% or 60% were obtained.

Composite materials were prepared as follows by using the resulting porous ceramic bodies as a reinforcement and an aluminum alloy as a matrix metal.

The porous ceramic was preheated to 800° C. and placed in a die set at 300° C. A molten aluminum alloy JIS AC8A (JIS H 5202) was pressed into the pores of the porous ceramic under a pressure of 100 MPa and cooled to solidify. The resulting composite material was removed from the die and subjected to a T6 treatment (defined in JIS H 5202).

A dumbbell specimen having a diameter of 6 mm and a length (parallel portion) of 25 mm was cut out of the composite material to determine tensile strength. A specimen was cut out along the horizontal direction or the pressing direction (perpendicular to the surface of the disk) to determine the coefficient of thermal expansion. The results obtained are shown in Table 1 below. For reference, the measured values of the aluminum alloy used as a matrix (AC8A) are also shown.

EXAMPLES 8 AND 9

73.2 wt % of aluminum hydroxide, 25.8 wt % of orthoboric acid (H$_3$BO$_3$), and 1 wt % of nickel oxide were thoroughly ground and mixed in a grinding machine. 20 wt % of carbon black was further added to the mixture and mixed uniformly. The resulting mixed powder was compacted in the same die as used in Example 5 to obtain a disk having a density of 0.40 g/cm³ or 0.35 g/cm³. The disks were fired in a furnace at 1250° C. for 6 hours to in situ synthesize aluminum borate whiskers (9Al$_2$O$_3$·2B$_2$O$_3$) in the compact while burning off carbon black. After cooling, the sintered compact was washed with hot water to remove unreacted boron oxide to give a porous ceramic material having a porosity of 85% or 90%.

Composite materials were prepared by using the resulting porous ceramic materials as a reinforcement and an aluminum alloy as a matrix metal in the same manner as in Example 5. The physical properties of the resulting material as measured in the same manner as in Example 5 are shown in Table 1.

COMPARATIVE EXAMPLES 1 AND 2

Commercially available aluminum borate whiskers (9Al$_2$O$_3$·2B$_2$O$_3$) were dispersed in 10-fold (by weight)

water. To the dispersion was added silica sol in an amount of 2% by weight in terms of $SiO_2$ based on the whiskers and mixed. The resulting slurry was poured in a cylindrical die for filtration, filtered, and squeezed from the top to obtain a disk. The disk was taken out of the die, dried, and calcined at 1200° C. for 1 hour to prepare an aluminum borate whisker preform having a diameter of 100 mm and a thickness of 20 mm. Thus, preforms having a porosity of 70% or 80% were prepared depending on the pressure on squeezing.

A whisker-reinforced metal matrix composite material was prepared in the same manner as in Example 5, except for using the above prepared whisker preform. The physical properties of the composite material were measured in the same manner as in Example 5. The obtained results are shown in Table 1.

TABLE 1

| Example No. | Porosity of Porous Ceramic % | Strength (MPa) Room Temp. | 350° C. | Thermal Expansion Coefficient (x10⁻⁶) Horizontal Direction | Pressing Direction |
|---|---|---|---|---|---|
| Example 5 | 60 | 387 | 191 | 10.5 | 10.6 |
| Example 6 | 70 | 353 | 167 | 12.5 | 12.4 |
| Example 7 | 80 | 315 | 140 | 16.1 | 16.1 |
| Example 8 | 85 | 304 | 116 | 17.5 | 17.2 |
| Example 9 | 90 | 282 | 94 | 19.2 | 19.4 |
| Comparative Example 1 | 70 | 338 | 140 | 10.8 | 15.2 |
| Comparative Example 2 | 80 | 283 | 105 | 12.9 | 17.9 |
| Reference (Al Alloy) | — | 245 | 46 | 20.7 | 20.9 |

As can be seen from Table 1, with the volume percentage of the reinforcement to matrix being equal, the metal-matrix composite materials according to the invention exhibit higher strength at 350° C. than those using a conventional preform as a reinforcement. This seems to be because of the higher strength and higher heat resistance possessed by the porous ceramic material per se than those of the preform. Further, the comparative materials show a marked variation of thermal expansion coefficient depending on the direction, while such a directional difference does not occur in the materials of the invention, proving that the reinforcement used in the invention has perfect isotropy.

On observing the outer appearance and the cut area of the composite materials, no deformation nor breakage of the reinforcement was found in the materials of Examples, whereas the preform of the comparative composite materials was found to suffer from deformation and breakage due to the pressure.

As has been described and demonstrated, the present invention provides a porous inorganic material composed of aluminum borate whiskers through a simple process comprising compacting a mixture of inexpensive raw materials and firing the green compact to cause reaction. There is no need of to use expensive whiskers, which have been used in conventional process to form a whisker preform by filtration. All the problems associated with a conventional process which arise form scattering of whiskers and uneven distribution or orientation of whiskers are solved. Since the product density can be controlled simply by adjusting the compact pressure in the mixed powder, it is easy to change the product density in accordance with the end use, and the possible range of densities which the product can have is broader than in a conventional process. The performance of aluminum borate whiskers can be taken advantage of to a possible highest degree in the porous structure in which the whiskers are not oriented in a specific direction and are united into one body via common bonds made up of aluminum borate without relying on a binder. Hence, the porous material is excellent in strength, heat resistance, corrosion resistance as well as uniformity of these characteristics.

The porous inorganic material used as a reinforcement in the invention is composed solely of aluminum borate whiskers which are distributed quite randomly and yet uniformly without being oriented in a specific direction. The bonds connecting the whiskers are strong and chemically stable the bonds are formed from aluminum borate common to and constituting part of each one of the aluminum borate whiskers bonded at the bonding site without relying on a binder. Therefore, the porous ceramic body can achieve isotropic reinforcement while retaining its original shape without undergoing deformation or breakage under a strong stress imposed during casting. The porous ceramic body shows satisfactory permeability to a molten metal and undergoes no reaction with an infiltrating molten metal.

The process for producing a whisker reinforced metal-matrix composite material according to the invention is characterized in that a high quality product can be obtained with more excellent workability and in a higher yield than a conventional process using a whisker preform as a reinforcement. Since the in situ synthesized porous ceramic with a skeleton structure of aluminum borate whiskers according to the invention as a reinforcement can have its porosity controlled easier and over a broader range than the conventional whisker preform, the ratio of reinforcement to matrix can be varied widely according to the end use.

While the invention has been described in detail and with reference to specific examples thereof, it will be apparent to one skilled in the art that various changes and modifications can be made therein without departing from the spirit and scope thereof.

What is claimed is:

1. A porous ceramic sintered product comprising aluminum borate whiskers distributed uniformly and randomly, wherein said aluminum borate whiskers of said porous ceramic sintered product are bonded to one another at respective bonding sites, said bonding sites being formed from aluminum borate common to and constituting part of at least a respective two of said aluminum borate whiskers which are bonded at said bonding site.

2. The porous ceramic sintered product of claim 1, wherein said porous ceramic sintered product is in-situ synthesized via sintering so as to define a skeleton structure of said aluminum borate whiskers, said skeleton structure being synthesized by firing a green (powder) compact of a mixture of aluminum borate whisker-forming raw materials.

3. The porous ceramic sintered product of claim 1, wherein said ceramic sintered product has a density of 0.15 to 1.5 g/cm³.

4. The porous ceramic sintered product of claim 1, wherein said aluminum borate whiskers have a composition of $9Al_2O_3 \cdot 2B_2O_3$.

5. The porous ceramic sintered product of claim 1, wherein said aluminum borate whiskers of said porous ceramic sintered product are grown randomly in three dimensions.

* * * * *